United States Patent
Kramer et al.

(10) Patent No.: US 12,448,552 B2
(45) Date of Patent: Oct. 21, 2025

(54) ADHESIVE BOND BETWEEN A THERMOPLASTIC MATERIAL AND AN ELASTOMER COMPOSITION

(71) Applicant: SIKA TECHNOLOGY AG, Baar (CH)

(72) Inventors: Andreas Kramer, Zürich (CH); Urs Burckhardt, Zürich (CH); Michael Schlumpf, Stallikon (CH); Martin Demmig, Quickborn (DE)

(73) Assignee: SIKA TECHNOLOGY AG, Baar (CH)

( * ) Notice: Subject to any disclaimer, the term of this patent is extended or adjusted under 35 U.S.C. 154(b) by 1266 days.

(21) Appl. No.: 17/274,120

(22) PCT Filed: Nov. 11, 2019

(86) PCT No.: PCT/EP2019/080847
§ 371 (c)(1),
(2) Date: Mar. 5, 2021

(87) PCT Pub. No.: WO2020/099308
PCT Pub. Date: May 22, 2020

(65) Prior Publication Data
US 2021/0189205 A1    Jun. 24, 2021

(30) Foreign Application Priority Data

Nov. 14, 2018 (EP) .................... 18206323

(51) Int. Cl.
| | | |
|---|---|---|
| *C09J 175/08* | (2006.01) | |
| *C08G 18/10* | (2006.01) | |
| *C08G 18/30* | (2006.01) | |
| *C08G 18/48* | (2006.01) | |
| *C08G 18/71* | (2006.01) | |
| *C08G 18/76* | (2006.01) | |

(52) U.S. Cl.
CPC ............ *C09J 175/08* (2013.01); *C08G 18/10* (2013.01); *C08G 18/307* (2013.01); *C08G 18/4825* (2013.01); *C08G 18/4829* (2013.01); *C08G 18/4841* (2013.01); *C08G 18/715* (2013.01); *C08G 18/7671* (2013.01)

(58) Field of Classification Search
None
See application file for complete search history.

(56) References Cited

U.S. PATENT DOCUMENTS

| | | | | |
|---|---|---|---|---|
| 5,955,512 A | * | 9/1999 | Numazawa ............ | C09J 175/16 428/343 |
| 9,714,316 B2 | | 7/2017 | Kramer et al. | |
| 2011/0071254 A1 | | 3/2011 | Bachon et al. | |
| 2011/0171465 A1 | | 7/2011 | Yasuda et al. | |
| 2012/0258317 A1 | * | 10/2012 | Demmig ............... | C08L 31/00 156/331.7 |
| 2015/0126678 A1 | * | 5/2015 | Kramer ................. | C08G 18/10 556/419 |
| 2021/0147674 A1 | * | 5/2021 | Kramer .................... | C08K 3/04 |

FOREIGN PATENT DOCUMENTS

| | | | |
|---|---|---|---|
| CN | 109096947 A | | 12/2018 |
| JP | 59109553 A | * | 6/1984 |
| JP | S59-109553 A | | 6/1984 |
| WO | 2008/156611 A1 | | 12/2008 |
| WO | 2014/006189 A1 | | 1/2014 |
| WO | WO-2020030606 A1 | * | 2/2020 ............ C08G 18/10 |

OTHER PUBLICATIONS

Machine translation of JP59109553A, published on Jun. 25, 1984, retrived from https://www.j-platpat.inpit.go.jp/c1801/PU/JP-S59-109553/11/en (Year: 1984).*
English translation of Masao Fukuda et al. JP S59-109553 A, Jun. 25, 1984 (Year: 1984).*
Jan. 23, 2020 International Search Report issued in International Patent Application No. PCT/EP2019/080847.
May 18, 2021 International Preliminary Report on Patentability issued in International Patent Application No. PCT/EP2019/080847.

* cited by examiner

*Primary Examiner* — Anish P Desai
(74) *Attorney, Agent, or Firm* — Oliff PLC

(57) ABSTRACT

An adhesive bond between at least one thermoplastic and an elastomer composition containing at least one polyether having blocked hydroxyl groups as plasticizer. With the adhesive bond, it is possible to bond thermoplastics such as polycarbonate or polystyrene in particular to the elastomer composition essentially without stress cracking and hence reliably and permanently.

11 Claims, No Drawings

ADHESIVE BOND BETWEEN A THERMOPLASTIC MATERIAL AND AN ELASTOMER COMPOSITION

TECHNICAL FIELD

The invention relates to adhesive bonds between thermoplastics and elastomer corn positions.

STATE OF THE ART

Ever more plastics are being used in modern modes of construction in building and in industrial manufacture, and are displacing conventional materials such as glass or metals. The advantages of plastics here include low specific weight, the insulating effect, ease of shaping or low costs. However, the use of plastics also brings challenges, especially with regard to the assembly methods conducted therewith, such as bonding or coating. For instance, many of the commonly used thermoplastics, such as polycarbonate or polystyrene in particular, are sensitive to stress cracking (crazing). The stress cracks arise from a combination of substances penetrating into the plastic from the outside, which weaken the plastic, and tensile stresses that exist in the plastic as intrinsic tension from the production and act externally on the plastic as a result of the assembly method. If substrates made of such plastics are bonded, for example, by means of elastic adhesives that are standard on the market, based, for example, on polyurethanes or silane-modified polymers, and are joined thereby via the elastomer composition formed from the cured adhesive, stress cracking is often so significant that it leads to deformation or to fracture of the plastic and/or to loss of adhesion to the elastomer composition and hence to the failure of the adhesive bond. Stress cracking is usually triggered by solvents or plasticizers that are typically present in the adhesives or elastomer compositions for adjustment of viscosity and elasticity. Since these are not incorporated chemically into the polymer matrix, they can penetrate (migrate) out of the elastomer composition into the plastic through diffusion and weaken it. Although it is possible for the plastic surface to be protected from contact with diffusing substances by a suitable pretreatment, for example by means of a primer, this often does not achieve reliable protection from stress cracking since the pretreatment is not applied in a sufficient breadth and layer thickness, or is not completely impenetrable to all kinds of diffusing substances.

SUMMARY OF THE INVENTION

It is therefore an object of the present invention to provide an adhesive bond between a thermoplastic and an elastomer composition that overcomes the disadvantages of the prior art in relation to stress cracking.

This object is achieved by an adhesive bond as described herein. With the adhesive bond of the invention, it is possible to bond thermoplastics such as polycarbonate or polystyrene in particular essentially without stress cracking and hence reliably and permanently to the elastomer composition, especially also in the case of incomplete or no pretreatment of the plastic surface. This is extremely surprising since the polyether having blocked hydroxyl groups which is present as plasticizer in the elastomer composition is mobile and highly elastifying, which if anything would suggest more stress cracking. In the adhesive bond of the invention, barely any stress cracks are formed even under external stress and under thermal stress, whereas adhesive bonds with conventional elastomer compositions comprising commercial plasticizers such as, in particular, diisononyl phthalate (DINP), diisodecyl phthalate (DIDP), diisononyl cyclohexane-1,2-dicarboxylate (DINCH), dioctyl adipate or di(2-ethylhexyl) adipate (DOA), acetyl tributyl citrate (ATBC) or aliphatic fatty acid esters already form many stress cracks after a short time, and the depth of these can increase so significantly with time as to ultimately result in the failure of the adhesive bond as a result of adhesion fracture or substrate fracture.

Further aspects of the invention are the subject of further independent claims. Particularly preferred embodiments of the invention are the subject of the dependent claims.

WAYS OF EXECUTING THE INVENTION

The invention relates to an adhesive bond between (i) at least one thermoplastic and (ii) an elastomer composition containing at least one polyether having blocked hydroxyl groups as plasticizer.

"Elastomer composition" refers to an elastically deformable plastic-containing material.

"Curable composition" refers to a composition comprising polymerizable macromolecules that can cure through crosslinking reactions of its reactive groups to give an elastomer composition.

"Polyether" refers to a molecule or a group of oligomeric and/or polymeric molecules that consist mainly of repeat alkyleneoxy units.

A "blocked hydroxyl group" refers to a hydroxyl group converted by chemical reaction to a group unreactive toward isocyanate groups.

"Plasticizer" refers to nonvolatile substances that are not chemically incorporated within the polymer and exert a plasticizing effect thereon.

A "silane group" refers to a silyl group bonded to an organic radical and having one to three, especially two or three, hydrolyzable alkoxy radicals on the silicon atom.

"Silane" refers both to organoalkoxysilanes bearing one to three organic substituents on each silane group and tetraalkoxysilanes. Silanes that bear one or more hydroxyl, isocyanato, amino or mercapto groups in addition to the silane group on an organic radical are referred to as "hydroxysilane", "isocyanatosilane", "aminosilane" and "mercaptosilane" respectively.

Substance names beginning with "poly", such as polyamine, polyol or polyisocyanate, refer to substances containing, in a formal sense, two or more of the functional groups that occur in their name per molecule.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

A curable composition referred to as "storage-stable" or "storable" is one that can be stored at room temperature in a suitable container over a prolonged period, typically over at least 3 months up to 6 months or more, without this storage resulting in any change in its application or use properties to an extent relevant to its use.

"Room temperature" refers to a temperature of 23° C.

The thermoplastic is especially what is called a stress-cracking plastic, i.e. a plastic having a tendency to form stress cracks under tensile stress and stress resulting from penetrating substances. This process is also referred to as environmental stress cracking (ESC).

The thermoplastic is preferably selected from the group consisting of polycarbonate, polyester, polymethylmethacrylate (PMMA), polystyrene and styrene-acrylonitrile (SAN).

The thermoplastic is especially polycarbonate or polystyrene. These plastics are particularly sensitive to the formation of stress cracks.

Most preferred is polycarbonate, especially a polycarbonate based on bisphenol A. Such a plastic is transparent, comparatively hard, impact-resistant and not very scratch-sensitive. It is often used as an alternative to glass, and the demand for elastomer compositions to which or with which such a plastic can be bonded or coated is correspondingly high.

Commercial polycarbonates are especially obtainable under the Makrolon® (from Covestro AG) or Lexan® (from SABIC) brand name.

The polyether having blocked hydroxyl groups is essentially free of unblocked hydroxyl groups. What is meant here by "essentially free" is that 95%, preferably 99%, especially 99.9%, most preferably 100%, of the hydroxyl groups present are blocked.

The polyether having blocked hydroxyl groups is present as plasticizer in the elastomer composition. It is accordingly preferably free of reactive groups that enter into crosslinking reactions with moisture or with ingredients present in the composition. It is especially free of isocyanate groups and silane groups.

The polyether having blocked hydroxyl groups is especially liquid at room temperature.

The polyether having blocked hydroxyl groups preferably has a viscosity at 20° C. in the range from 30 to 5,000 mPa·s, more preferably 40 to 2,000 mPa·s, especially preferably 50 to 1,000 mPas, in particular 50 to 500 mPas. The viscosity is determined here with a cone-plate viscometer having cone diameter 25 mm, cone angle 1°, cone tip-plate distance 0.05 mm, at a shear rate of 10 s$^{-1}$. Such a polyether is easy to handle and enables very flexible elastomer compositions.

The blocked hydroxyl groups are preferably selected from the group consisting of ester, aceto ester, carbonate and urethane groups.

The urethane groups also include sulfonylurethane groups.

These ester, aceto ester, carbonate or urethane groups preferably have 1 to 15 carbon atoms.

Particular preference is given to ester or urethane groups. Hydroxyl groups can be converted to these groups in a particularly simple manner.

Very particular preference is given to an ester group, especially an ester group having 1 to 8 carbon atoms.

Most preferred is an acetate group. A polyether having blocked hydroxyl groups in the form of acetate groups is of particularly low viscosity, is obtainable in a very particularly simple manner and is particularly inexpensive.

Also preferred is a urethane group, especially a phenylurethane group or a p-toluenesulfonylurethane group. A polyether having such blocked hydroxyl groups has a manageable viscosity and is preparable in a particularly simple manner.

A preferred aceto ester group is an acetoacetate group.

A preferred carbonate group is a methyl carbonate group.

These are of low viscosity and obtainable from inexpensive raw materials.

Repeat units present in the polyether having blocked hydroxyl groups are preferably 1,2-ethyleneoxy, 1,2-propyleneoxy, 1,3-propyleneoxy, 1,2-butyleneoxy or 1,4-butyleneoxy groups, especially 1,2-propyleneoxy groups.

Preferably, 70% to 100% by weight, especially 80% to 100% by weight, of the repeat units consist of 1,2-propyleneoxy groups, and 0% to 30% by weight, especially 0% to 20% by weight, of the repeat units consist of 1,2-ethyleneoxy groups.

More preferably, the repeat units consist entirely of 1,2-propyleneoxy groups.

Such polyethers are readily available, hydrophobic and hence particularly suitable as a constituent of elastomer compositions having low water absorption and good stability.

The polyether having blocked hydroxyl groups preferably has an average molecular weight $M_n$ in the range from 600 to 12,500 g/mol, more preferably 700 to 8,500 g/mol, especially preferably 800 to 4,500 g/mol, in particular 800 to 2,500 g/mol, determined by means of gel permeation chromatography (GPC) against polystyrene as standard with tetrahydrofuran as mobile phase, refractive index detector and evaluation from 200 g/mol.

Such polyethers having blocked hydroxyl groups have a viscosity which is easy to handle and cause neither emission nor odor in elastomer compositions.

In a preferred embodiment, the average molecular weight $M_n$ of the polyether having blocked hydroxyl groups is in the range from 700 to 2,500 g/mol, preferably 800 to 2,500 g/mol. Such a polyether is of particularly low viscosity and particularly easy to handle, and has good properties in relation to propensity to stress cracks in the adhesive bond.

In a further preferred embodiment, the average molecular weight $M_n$ of the polyether having blocked hydroxyl groups is in the range from 2,500 to 12,500 g/mol, especially 4,000 to 8,500 g/mol. Such a polyether has a manageable viscosity and enables adhesive bonds where no stress cracks occur even in particularly sensitive thermoplastics.

The polyether having blocked hydroxyl groups is preferably derived from at least one hydroxy-functional polyether selected from the group consisting of alcohol-started, especially n-butanol-started, polyoxypropylene monools having an OH number in the range from 25 to 90 mg KOH/g, preferably 50 to 80 mg KOH/g, polyoxypropylene diols having an OH number in the range from 9 to 155 mg KOH/g, preferably 14 to 125 mg KOH/g, trimethylolpropane- or especially glycerol-started, optionally ethylene oxide-terminated polyoxypropylene triols having an average OH functionality in the range from 2.2 to 3 and an OH number in the range from 20 to 230 mg KOH/g, preferably 20 to 165 mg KOH/g, and sugar alcohol-started polyoxypropylene polyols having an average OH functionality in the range from 3 to 6, especially with threitol, erythritol, xylitol, mannitol or sorbitol as starter molecule. Such a polyether having blocked hydroxyl groups is commercially available as Sanflex® SPX-80 (from Sanyo Chem. Ind.).

In one embodiment of the invention, the polyether having blocked hydroxyl groups is especially derived from an alcohol-started, especially n-butanol-started, polyoxypropylene monool having an OH number in the range from 25 to 90 mg KOH/g, preferably 50 to 80 mg KOH/g, or a polyoxypropylene diol having an OH number in the range from 45 to 125 mg KOH/g. These are particularly inexpensive and low in viscosity.

In a further embodiment of the invention, the polyether having blocked hydroxyl groups is especially derived from a polyoxypropylene diol having an OH number in the range from 14 to 45 mg KOH/g, especially 14 to 28 mg KOH/g, or a trimethylolpropane- or especially glycerol-started, optionally ethylene oxide-terminated polyoxypropylene triol having an OH number in the range from 20 to 56 mg KOH/g. Such a polyether enables adhesive bonds where no stress cracks occur even in particularly sensitive thermoplastics.

More preferably, the polyether having blocked hydroxyl groups is derived from a polyoxypropylene diol having an OH number in the range from 14 to 125 mg KOH/g. These are particularly inexpensive.

The polyether having blocked hydroxyl groups is especially obtained by reacting at least one hydroxy-functional polyether with at least one suitable blocking agent for hydroxyl groups.

For the reaction, the blocking agent is used at least stoichiometrically in relation to the hydroxyl groups, such that the hydroxyl groups are essentially completely blocked and the polyether obtained is thus essentially free of hydroxyl groups. For the blocking, methods customary for the respective reactive groups are used, optionally with additional use of catalysts or solvents. If the blocking reaction forms elimination products, these are removed from the reaction mixture by a suitable method, especially by means of distillation.

Suitable blocking agents are nucleophilic compounds that enter into an addition or substitution reaction with hydroxyl groups.

Especially suitable are carboxylic acids, carbonyl chlorides, carboxylic esters or carboxylic anhydrides, diketene, 2,2,5-trimethyl-4H-1,3-dioxin-2-one, alkyl acetoacetates, dialkyl carbonates, monoisocyanates, (meth)acrylamides, methylenemalonates or cyanoacrylates.

Preference is given to carboxylic acids, carbonyl chlorides, carboxylic esters or carboxylic anhydrides, with formation of blocked hydroxyl groups in the form of ester groups. Among these, preference is given to carboxylic anhydrides or carboxylic esters, especially acetic anhydride.

In the case of acetic anhydride as blocking agent, the reaction releases acetic acid, with formation of blocked hydroxyl groups in the form of acetate groups.

In the case of isopropenyl acetate as blocking agent, the reaction releases acetone, likewise with formation of blocked hydroxyl groups in the form of acetate groups.

Preference is further given to diketene, 2,2,5-trimethyl-4H-1,3-dioxin-4-one or sterically hindered alkyl acetoacetates such as, in particular, tert-butyl acetoacetate, with formation of blocked hydroxyl groups in the form of aceto ester groups.

Preference is further given to dialkyl carbonates, especially dimethyl carbonate, with formation of blocked hydroxyl groups in the form of carbonate groups, especially methyl carbonate groups.

Preference is further given to monoisocyanates, with formation of blocked hydroxyl groups in the form of urethane groups. Preference is given to phenyl isocyanate or p-toluenesulfonyl isocyanate.

Suitable hydroxy-functional polyethers are especially those having an average OH functionality in the range from 1 to 6 and an average molecular weight $M_n$ in the range from 500 to 12,500 g/mol, more preferably 600 to 8,500 g/mol, especially preferably 700 to 4,500 g/mol, in particular 700 to 2,500 g/mol.

Preference is given to polyoxypropylene monools having an OH number in the range from 25 to 90 mg KOH/g, preferably 50 to 80 mg KOH/g, especially alcohol-started polyoxypropylene monools, especially started from methanol, ethanol, propanol, isopropanol, n-butanol, isobutanol, tert-butanol, pentanol, hexanol, 2-ethylhexanol, lauryl alcohol, myristyl alcohol, palmityl alcohol, allyl alcohol, cyclohexanol, benzyl alcohol or phenol. Among these, preference is given to alkyl alcohol-started polyoxypropylene monools, especially started from methanol, ethanol or n-butanol. Particular preference is given to n-butanol-started polyoxypropylene monools having an average molecular weight $M_n$ in the range from 650 to 2,000 g/mol, especially 700 to 1,500 g/mol. n-Butanol-started polyoxypropylene monools are commercially available, for example as Synalox® 100-20B, Synalox® 100-40B or Synalox® 100-85B (all from Dow DuPont Inc.).

Also preferred are polyoxypropylene diols having an OH number in the range from 9 to 155 mg KOH/g, preferably 14 to 125 mg KOH/g.

Also preferred are trimethylolpropane- or especially glycerol-started, optionally ethylene oxide-terminated polyoxypropylene triols having an average OH functionality in the range from 2.2 to 3 and an OH number in the range from 20 to 230 mg KOH/g, preferably 20 to 165 mg KOH/g.

Also preferred are sugar alcohol-started polyoxypropylene polyols having an average OH functionality of at least 3, especially in the range from 3 to 6, especially with threitol, erythritol, xylitol, mannitol or sorbitol as starter molecule.

The elastomer composition preferably comprises at least one cured polyurethane polymer or cured silane-modified polymer.

The elastomer composition may comprise further substances, especially the following additions:
    fillers, especially ground or precipitated calcium carbonates, optionally coated with fatty acids, especially stearates, barytes, quartz flours, quartz sands, dolomites, wollastonites, kaolins, calcined kaolins, sheet silicates, such as mica or talc, zeolites, aluminum hydroxides, magnesium hydroxides, silicas, including finely divided silicas from pyrolysis processes, industrially produced carbon blacks, graphite, metal powders, for example of aluminum, copper, iron, silver or steel, PVC powders or hollow beads;
    inorganic or organic pigments, especially titanium dioxide, chromium oxides or iron oxides;
    additional plasticizers, especially carboxylic acid esters, such as phthalates, especially diisononyl phthalate (DINP), diisodecyl phthalate (DIDP) or di(2-propylheptyl)phthalate (DPHP), hydrogenated phthalates or cyclohexane-1,2-dicarboxylates, especially hydrogenated diisononyl phthalate or diisononyl cyclohexane-1,2-dicarboxylate (DINCH), terephthalates, especially bis(2-ethylhexyl) terephthalate (DOTP) or diisononyl terephthalate (DINT), hydrogenated terephthalates or cyclohexane-1,4-dicarboxylates, especially hydrogenated bis(2-ethylhexyl) terephthalate or bis(2-ethylhexyl) cyclohexane-1,4-dicarboxylate, or hydrogenated diisononyl terephthalate or diisononyl cyclohexane-1,4-dicarboxylate, isophthalates, trimellitates, adipates, especially dioctyl adipate, azelates, sebacates, benzoates, glycol ethers, glycol esters, organic phosphoric or sulfonic acid esters, polybutenes, polyisobutenes or plasticizers derived from natural fats or oils, especially epoxidized soybean or linseed oil, more preferably diisononyl phthalate, diisodecyl phthalate or diisononyl cyclohexane-1,2-dicarboxylate;

fibers, especially glass fibers, carbon fibers, metal fibers, ceramic fibers, polymer fibers, such as polyamide fibers or polyethylene fibers, or natural fibers, such as wool, cellulose, hemp or sisal;

nanofillers such as graphene or carbon nanotubes;

dyes;

natural resins, fats or oils;

nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene/vinyl acetate copolymers (EVA) or atactic poly-α-olefins (APAO);

flame-retardant substances, especially the aluminum hydroxide or magnesium hydroxide fillers already mentioned, and also especially organic phosphoric acid esters, such as especially triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris (2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate) or ammonium polyphosphates; or additives, in particular wetting agents, leveling agents, defoamers, deaerators, stabilizers against oxidation, heat, light or UV radiation, or biocides.

The elastomer composition preferably contains 5% to 40%, especially 5% to 30%, by weight of polyethers having blocked hydroxyl groups.

A particularly preferred elastomer composition comprises
20% to 80%, especially 25% to 70%, by weight of cured polymer,
10% to 60%, especially 20% to 60%, by weight of fillers, and
5% to 40%, especially 5% to 30%, by weight of polyethers having blocked hydroxyl groups.

The elastomer composition preferably has a tensile strength of at least 1 MPa, especially at least 1.5 MPa, and an elongation at break of at least 50%, especially at least 100%, determined at 23° C. on dumbbell-shaped test specimens having a thickness of 2 mm, a length of 75 mm, a bar length of 30 mm and a bar width of 4 mm to DIN EN 53504.

The elastomer composition in the adhesive bond of the invention preferably has a layer thickness in the range from 0.5 to 50 mm, preferably 1 to 30 mm.

The adhesive bond of the invention is preferably obtained from a process comprising the steps of
(a) providing at least one thermoplastic substrate,
(b) providing a curable composition comprising at least one polyether having blocked hydroxyl groups as plasticizer,
(c) applying the curable composition to the plastic substrate,
(d) curing the curable composition to give the elastomer composition.

The curable composition is especially an adhesive, sealant or coating. It is preferably an adhesive.

The process is preferably conducted at ambient temperature, especially at a temperature in the range from about −10 to 50° C., preferably in the range from −5 to 45° C., especially 0 to 40° C.

Step (a) preferably comprises cleaning of the plastic substrate to remove dust and any soiling present, especially by means of a cleaning agent that does not attack the plastic substrate.

Step (a) optionally also comprises a pretreatment of the plastic substrate with an activator and/or primer. This is applied to the plastic substrate in a thin layer and then flashed off. This involves evaporating the solvent present in the activator and/or primer, leaving the pretreated plastic substrate. The activator and/or primer preferably does not contain any ingredients that attack the plastic substrate.

Step (b), in the case of a multicomponent curable composition, comprises the mixing of the components to give a macroscopically homogeneous paste or liquid.

Step (d) typically comprises a wait time at ambient temperature in the range from one hour up to one week. In the case of a moisture-curing composition, the composition applied is in contact with air humidity. If desired, the adhesive bond can be heated, for example to a temperature in the range from 20 to 120° C. In the course of step (d), the curing composition builds up adhesion to the plastic substrate and, on completion of step (d), can be parted from the plastic substrate only with a certain expenditure of force, preferably only with destruction of the elastomer composition formed.

The curable composition for the production of the adhesive bond of the invention preferably has isocyanate and/or silane groups, especially isocyanate groups.

The curable composition preferably comprises at least one polymer containing isocyanate and/or silane groups. Such a composition cures by means of air humidity or via admixing of a component that typically comprises polyols, amines, latent curing agents or water or a combination thereof to give an elastomer composition.

The polymer containing isocyanate and/or silane groups is preferably liquid at room temperature.

The curable composition is preferably a one-component or two-component composition.

A composition referred to as a "one-component" composition is one in which all constituents of the composition are in the same container, which is storage-stable per se and which is curable with moisture.

A composition referred to as a "two-component" composition is one in which the constituents of the composition are in two different components which are stored in separate containers and are not mixed with one another until shortly before or during the application of the composition.

The curable composition more preferably comprises at least one polymer containing isocyanate groups.

A suitable polymer containing isocyanate groups is especially obtained from the reaction of at least one polyol with a superstoichiometric amount of at least one diisocyanate. The reaction is preferably conducted with exclusion of moisture at a temperature in the range from 20 to 160° C., especially 40 to 140° C., optionally in the presence of suitable catalysts. The polymer is optionally prepared with additional use of plasticizers or solvents, in which case the plasticizers or solvents used do not contain any groups reactive toward isocyanates.

For use in a two-component composition, the excess of polyisocyanate is preferably chosen so as to leave, in the polymer containing isocyanate groups, after the reaction of all hydroxyl groups, a content of isocyanate groups in the range from 1% to 30% by weight, preferably 1.5% to 25% by weight, more preferably 2% to 20% by weight, based on the overall polymer.

Such a polymer containing isocyanate groups preferably has an average molecular weight $M_n$ in the range from 350 to 6,000 g/mol.

For use in a one-component composition, the NCO/OH ratio is preferably in the range from 1.3/1 to 10/1. The monomeric diisocyanate remaining in the reaction mixture after the reaction of the OH groups can be removed, especially by means of distillation.

If excess monomeric diisocyanate is removed by means of distillation, the NCO/OH ratio in the reaction is preferably in the range from 4/1 to 7/1, and the resultant polymer containing isocyanate groups, after the distillation, preferably contains not more than 0.5% by weight, more preferably not more than 0.3% by weight, of monomeric diisocyanate. Monomeric diisocyanate is especially removed by means of short-path distillation under reduced pressure.

If no excess monomeric diisocyanate is removed from the polymer, the NCO/OH ratio in the reaction is preferably in the range from 1.3/1 to 2.5/1.

The resultant polymer preferably has a content of isocyanate groups in the range from 0.5% to 10% by weight, especially 1% to 5% by weight, more preferably 1% to 3% by weight, and an average molecular weight $M_n$ in the range from 1,500 to 20,000 g/mol, especially 2,000 to 15,000 g/mol.

Preference is given to aliphatic, cycloaliphatic or aromatic diisocyanates, especially hexamethylene 1,6-diisocyanate (HDI), 1-isocyanato-3,3,5-trimethyl-5-isocyanatomethylcyclohexane (isophorone diisocyanate or IPDI), perhydro(diphenylmethane 2,4'- and/or 4,4'-diisocyanate) ($H_{12}MDI$), diphenylmethane 4,4'-diisocyanate, with or without fractions of diphenylmethane 2,4'- and/or 2,2'-diisocyanate (MDI), or tolylene 2,4-diisocyanate or mixtures thereof with tolylene 2,6-diisocyanate (TDI).

Particular preference is given to HDI, IPDI, MDI or TDI, or mixtures thereof.

Suitable polyols are commercial polyols or mixtures thereof, especially polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those with styrene/acrylonitrile (SAN) particles or polyurea or polyhydrazodicarbonamide (PHD) particles.

Preferred polyether polyols are polyoxypropylene diols or polyoxypropylene triols, or what are called ethylene oxide-terminated (EO-capped or EO-tipped) polyoxypropylene diols or triols. The latter are mixed polyoxyethylene/polyoxypropylene polyols which are especially obtained in that polyoxypropylene diols or triols, on conclusion of the polypropoxylation reaction, are further alkoxylated with ethylene oxide and hence have primary hydroxyl groups.

Preferred polyether polyols have a level of unsaturation of less than 0.02 meq/g, especially less than 0.01 meq/g.

Polyester polyols, also called oligoesterols, prepared by known processes, especially the polycondensation of hydroxycarboxylic acids or lactones or the polycondensation of aliphatic and/or aromatic polycarboxylic acids with di- or polyhydric alcohols. Preference is given to polyester diols from the reaction of dihydric alcohols, such as, in particular, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, such as, in particular, succinic acid, glutaric acid, adipic acid, suberic acid, sebacic acid, dodecanedicarboxylic acid, maleic acid, fumaric acid, phthalic acid, isophthalic acid, terephthalic acid, cyclohexane-1,2-dicarboxylic acid, cyclohexane-1,3-dicarboxylic acid or cyclohexane-1,4-dicarboxylic acid or mixtures of the aforementioned acids, or polyester polyols formed from lactones such as, in particular, ε-caprolactone. Particular preference is given to polyester polyols formed from adipic acid or sebacic acid or dodecanedicarboxylic acid and hexanediol or neopentyl glycol.

Polycarbonate polyols as obtainable by reaction, for example, of the abovementioned alcohols—used to form the polyester polyols—with dialkyl carbonates, diaryl carbonates or phosgene.

Block copolymers bearing at least two OH groups and having at least two different blocks having polyether, polyester and/or polycarbonate structure of the type described above, especially polyether polyester polyols.

Polyacrylate or polymethacrylate polyols.

Polyhydroxy-functional fats or oils, for example natural fats and oils, especially castor oil; or polyols obtained by chemical modification of natural fats and oils—called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes, such as alcoholysis or ozonolysis, and subsequent chemical linkage, for example by transesterification or dimerization, of the degradation products or derivatives thereof thus obtained. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Polyhydrocarbon polyols, also called oligohydrocarbonols, such as, in particular, polyhydroxy-functional polyolefins, polyisobutylenes, polyisoprenes; polyhydroxy-functional ethylene/propylene, ethylene/butylene or ethylene/propylene/diene copolymers, as produced, for example, by Kraton Polymers; polyhydroxy-functional polymers of dienes, especially of 1,3-butadiene, which can especially also be prepared from anionic polymerization; polyhydroxy-functional copolymers of dienes, such as 1,3-butadiene, or diene mixtures and vinyl monomers, such as styrene, acrylonitrile, vinyl chloride, vinyl acetate, vinyl alcohol, isobutylene or isoprene, especially polyhydroxy-functional acrylonitrile/butadiene copolymers, as can be prepared, in particular, from epoxides or amino alcohols and carboxyl-terminated acrylonitrile/butadiene copolymers (commercially available, for example, under the Hypro® CTBN or CTBNX or ETBN name from Emerald Performance Materials); or hydrogenated polyhydroxy-functional polymers or copolymers of dienes.

Also especially suitable are mixtures of polyols.

Preference is given to polyether polyols, polyester polyols, polycarbonate polyols, poly(meth)acrylate polyols or polybutadiene polyols.

Particular preference is given to polyether polyols, polyester polyols, especially aliphatic polyester polyols, or polycarbonate polyols, especially aliphatic polycarbonate polyols.

Especially preferred are polyether polyols, especially polyoxyalkylene polyols. Most preferred are polyoxypropylene di- or triols or ethylene oxide-terminated polyoxypropylene di- or triols.

Preference is given to polyols having an average molecular weight $M_n$ in the range from 400 to 20,000 g/mol, preferably from 1000 to 15,000 g/mol.

Preference is given to polyols having an average OH functionality in the range from 1.6 to 3.

Preference is given to polyols that are liquid at room temperature.

In the preparation of a polymer containing isocyanate groups, it is also possible to use fractions of di- or polyfunctional alcohols, especially ethane-1,2-diol, propane-1,2-diol, propane-1,3-diol, 2-methylpropane-1,3-diol, butane-1,2-diol, butane-1,3-diol, butane-1,4-diol, pentane-1,3-diol, pentane-1,5-diol, 3-methylpentane-1,5-diol, neopentyl glycol, dibromoneopentyl glycol, hexane-1,2-diol, hexane-1,6-diol, heptane-1,7-diol, octane-1,2-diol, octane-1,8-diol, 2-ethylhexane-1,3-diol, diethylene glycol, triethylene glycol, dipropylene glycol, tripropylene glycol, cyclohexane-1,3- or -1,4-dimethanol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols, such as especially xylitol, sorbitol or mannitol, or sugars such as, in particular, sucrose, or alkoxylated derivatives of the alcohols mentioned or mixtures of the alcohols mentioned.

The polymer containing isocyanate groups preferably has an average molecular weight $M_n$ in the range from 1,500 to 20,000 g/mol, especially 2,000 to 15,000 g/mol.

In addition to a polymer containing isocyanate groups, the composition may comprise at least one oligomeric isocyanate or a form of MDI that is liquid at room temperature.

Suitable oligomeric isocyanates are especially HDI biurets such as Desmodur® N 100 or N 3200 (from Covestro AG), Tolonate® HDB or HDB-LV (from Vencorex Holding SAS) or Duranate® 24A-100 (from Asahi Kasei Corp.); HDI isocyanurates such as Desmodur® N 3300, N 3600 or N 3790 BA (all from Covestro AG), Tolonate® HDT, HDT-LV or HDT-LV2 (from Vencorex Holding SAS), Duranate® TPA-100 or THA-100 (from Asahi Kasei Corp.) or Coronate® HX (from Tosoh Corp.); HDI uretdiones such as Desmodur® N 3400 (from Covestro AG); HDI iminooxadiazinediones such as Desmodur® XP 2410 (from Covestro AG); HDI allophanates such as Desmodur® VP LS 2102 (from Covestro AG); IPDI isocyanurates, for example in solution as Desmodur® Z 4470 (from Covestro AG) or in solid form as Vestanat® T1890/100 (from Evonik Industries AG); TDI oligomers such as Desmodur® IL (from Covestro AG); or mixed isocyanurates based on TDI/HDI, such as Desmodur® HL (from Covestro AG).

A form of MDI which is liquid at room temperature is either 4,4'-MDI liquefied by partial chemical modification—especially carbodiimidization or uretonimine formation or adduct formation with polyols—or it is a mixture of 4,4'-MDI with other MDI isomers (2,4'-MDI and/or 2,2'-MDI), and/or with MDI oligomers and/or MDI homologs (polymeric MDI or PMDI), that has been brought about selectively by blending or results from the production process.

In addition to at least one polyisocyanate and/or polymer containing isocyanate groups, the curable composition may comprise at least one latent curing agent, especially an enamine, ketimine, aldimine or oxazolidine, more preferably an aldimine or oxazolidine, most preferably a di- or trialdimine.

In a preferred embodiment, the curable composition is a one-component polyurethane composition and, in addition to the polyether having blocked amino groups, comprises at least one polymer containing isocyanate groups and optionally at least one latent curing agent.

In a further preferred embodiment, the curable composition is a two-component polyurethane composition and consists of a first component comprising at least one polyol and a second component comprising at least one polyisocyanate and optionally at least one polymer containing isocyanate groups, where the polyether having blocked amino groups and optionally at least one latent curing agent are each present in one of the two or both components. Suitable polyols are especially the polyols already mentioned as being suitable for preparation of a polymer containing isocyanate groups.

In a further preferred embodiment, the curable composition is a silane-modified polymer composition (SMP) and comprises at least one organic polymer containing silane groups.

Such a curable composition is preferably a one-component composition.

The organic polymer containing silane groups preferably has silane groups of the formula

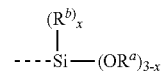

where $R^a$ is a linear or branched, monovalent hydrocarbyl radical having 1 to 5 carbon atoms, especially methyl or ethyl, $R^b$ is a linear or branched monovalent hydrocarbyl radical having 1 to 8 carbon atoms, especially methyl, and x is 0 or 1 or 2, preferably 0 or 1, especially 0.

Methoxysilane groups have the advantage here that they are particularly reactive. Ethoxysilane groups have the advantage that they are toxicologically advantageous and particularly storage-stable.

Particular preference is given to trimethoxysilane groups, dimethoxymethylsilane groups or triethoxysilane groups.

Most preferred are trimethoxysilane groups or triethoxysilane groups.

A preferred organic polymer containing silane groups is a polyolefin or a polyester or a polyamide or a poly(meth)acrylate or a polyether or a mixed form of these polymers.

The silane groups may be in pendant positions in the chain or in terminal positions and are attached to the organic polymer via a carbon atom.

More preferably, the organic polymer containing silane groups is a polyether containing silane groups.

"Polyethers containing silane groups" refer to organic polymers containing at least one silane group, wherein the polymer chain has mainly polyether units, especially 1,2-oxypropylene units. As well as the polyether units, it is especially also possible for there to be urethane groups, urea groups, thiourethane groups, ester groups or amide groups.

The polyether containing silane groups preferably contains at least 50% by weight, especially at least 70% by weight, more preferably at least 80% by weight, of 1,2-oxypropylene units.

Processes for preparing suitable polyethers containing silane groups are known to the person skilled in the art.

In a preferred process, polyethers containing silane groups are obtainable from the reaction of polyethers containing allyl groups with hydrosilanes, optionally with chain extension using diisocyanates for example.

In a further preferred process, polyethers containing silane groups are obtainable from the copolymerization of alkylene oxides and epoxysilanes, optionally with chain extension using diisocyanates for example.

In a further preferred process, polyethers containing silane groups are obtainable from the reaction of polyether polyols with isocyanatosilanes, optionally with chain extension using diisocyanates.

In a further preferred process, polyethers containing silane groups are obtainable from the reaction of polyethers containing isocyanate groups with aminosilanes, hydroxysilanes or mercaptosilanes. Polyethers containing silane groups from this process are particularly preferred. This process enables the use of a multitude of commercially readily available inexpensive starting materials by means of which different polymer properties are obtainable, especially high extensibility, high strength, low modulus of elasticity, low glass transition temperature or high weathering resistance.

More preferably, the polyether containing silane groups is obtainable from the reaction of polyethers containing isocyanate groups with aminosilanes and/or hydroxysilanes and/or mercaptosilanes.

Suitable polyethers containing isocyanate groups are especially obtainable from the reaction of polyether polyols, especially polyoxyalkylene diols or polyoxyalkylene triols, preferably polyoxypropylene diols or polyoxypropylene triols, with a superstoichiometric amount of polyisocyanates, especially diisocyanates.

It is preferable when the reaction between the polyisocyanate and the polyether polyol is conducted with exclusion of moisture at a temperature of 50° C. to 160° C., optionally in the presence of suitable catalysts, wherein the polyisocyanate has been dosed such that the isocyanate groups thereof are present in a stoichiometric excess in relation to the hydroxyl groups of the polyol. In particular, the excess of polyisocyanate is chosen so as to leave, after the reaction of all hydroxyl groups, a content of free isocyanate groups of 0.1% to 5% by weight, preferably 0.2% to 4% by weight, particularly preferably 0.3% to 3% by weight, based on the overall polymer.

Preferred diisocyanates are those already mentioned above. Particular preference is given to IPDI or TDI. Most preferred is IPDI. In this way, polyethers containing silane groups with particularly good lightfastness are obtained.

Especially suitable as polyether polyols are polyoxypropylenediols having a degree of unsaturation lower than 0.02 meq/g, especially lower than 0.01 meq/g, and an average molecular weight $M_n$ in the range from 400 to 25,000 g/mol, especially 1,000 to 20,000 g/mol.

In addition to polyether polyols it is also possible to use proportions of other polyols, in particular polyacrylate polyols and low-molecular-weight diols or triols.

Suitable aminosilanes for the reaction with a polyether containing isocyanate groups are primary and especially secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary aminosilanes such as 3-aminopropyltrimethoxysilane, 3-aminopropyldimethoxymethylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the recited aminosilanes with ethoxy groups in place of the methoxy groups on the silicon.

Suitable hydroxysilanes for the reaction with a polyether containing isocyanate groups are especially obtainable from the addition of aminosilanes onto lactones or onto cyclic carbonates or onto lactides.

Preferred hydroxysilanes that are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide or N-(3-triethoxysilylpropyl)-2-hydroxypropyl carbamate.

Further suitable hydroxysilanes are obtainable from the addition of aminosilanes onto epoxides or from the addition of amines onto epoxysilanes.

Preferred hydroxysilanes that are obtained in this way are 2-morpholino-4(5)-(2-trimethoxysilylethyl)cyclohexan-1-ol, 2-morpholino-4(5)-(2-triethoxysilylethyl)cyclohexan-1-ol or 1-morpholino-3-(3-(triethoxysilyl)propoxy)propan-2-ol.

Suitable mercaptosilanes for the reaction with a polyether containing isocyanate groups are especially 3-mercaptopropyltrimethoxysilane or 3-mercaptopropyltriethoxysilane.

Further suitable polyethers containing silane groups are commercially available products, especially the following: MS Polymer™ (from Kaneka Corp.; especially the 5203H, 5303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials Inc.; especially the 1010LM, 1015LM, 1050MM products); Vorasil™ (from DowDuPont Inc.; especially the 602 and 604 products); Desmoseal® (from Covestro AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35 products).

More preferably, the polyether containing silane groups is obtained from the reaction of at least one polyether containing isocyanate groups with at least one aminosilane and/or hydroxysilane and/or mercaptosilane.

Preferably, the aminosilane and/or hydroxysilane and/or mercaptosilane here is selected from the group consisting of dimethyl N-(3-trimethoxysilylpropyl)aminosuccinate, diethyl N-(3-trimethoxysilylpropyl)aminosuccinate, dimethyl N-(3-triethoxysilylpropyl)aminosuccinate, diethyl N-(3-triethoxysilylpropyl)aminosuccinate, N-(3-trimethoxysilylpropyl)-2-hydroxypropanamide, N-(3-triethoxysilylpropyl)-2-hydroxypropanamide, 3-mercaptopropyltrimethoxysilane and 3-mercaptopropyltriethoxysilane.

The preferred embodiments of the organic polymer containing silane groups enable compositions having good storage stability, rapid curing and particularly good mechanical properties, especially high elasticity and extensibility coupled with good strength, and high thermal stability.

The curable composition preferably additionally comprises one or more further constituents, especially selected from the group consisting of fillers, adhesion promoters, desiccants, thickeners and catalysts.

Particularly suitable fillers are the fillers already mentioned.

Suitable adhesion promoters are especially aminosilanes such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)propyl]ethylenediamine or the analogs thereof with ethoxy in place of methoxy groups, and also N-phenyl-, N-cyclohexyl- or N-alkylaminosilanes, mercaptosilanes, epoxysilanes, (meth)acrylosilanes, anhydridosilanes, carbamatosilanes, alkylsilanes or iminosilanes, oligomeric forms of these silanes, adducts formed from primary aminosilanes with epoxysilanes or (meth)acrylosilanes or anhydridosilanes, amino-functional alkylsilsesquioxanes, especially amino-functional methylsilsesquioxane or amino-functional propylsilsesquioxane, or titanates.

Especially suitable as adhesion promoters for a composition containing isocyanate groups are epoxysilanes such as, in particular, 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes.

Suitable desiccants for compositions comprising polymers containing silane groups are especially tetraethoxysilane, vinyltrimethoxysilane, vinyltriethoxysilane or organoalkoxysilanes having a functional group in a position to the silane group, especially N-(methyldimethoxysilylmethyl)-O-methylcarbamate, (methacryloyloxymethyl)silanes, methoxymethylsilanes, orthoformic esters, calcium oxide or molecular sieve powders.

Suitable desiccants for compositions containing isocyanate groups are especially molecular sieve powders, calcium oxide, highly reactive isocyanates such as p-tosyl isocyanate, monomeric diisocyanates or orthoformic esters.

Suitable thickeners are especially ureas, sheet silicates such as bentonites, derivatives of castor oil, hydrogenated castor oil, polyamides, polyurethanes or fumed silicas.

A preferred thickener is a paste spreadable at room temperature and containing 10% to 25% by weight of urea compounds and 75% to 90% by weight of the above-described polyethers having blocked hydroxyl groups. Such a paste is especially produced by reacting a diisocyanate, especially diphenylmethane 4,4'-diisocyanate, and a monoamine, especially n-butylamine, in the polyether having blocked hydroxyl groups.

Suitable catalysts are catalysts for the crosslinking of silane groups, especially metal catalysts such as, in particular, compounds of tin, titanium, zirconium, aluminum or zinc, and/or nitrogen compounds. Preference is given to diorganotin(IV) compounds such as, in particular, dibutyltin (IV) diacetate, dibutyltin(IV) dilaurate, dibutyltin(IV) dineodecanoate, dibutyltin(IV) bis(acetylacetonate) or dioctyltin (IV) dilaurate, and also titanium(IV) or zirconium(IV) or aluminum(III) or zinc(II) complexes with, in particular, alkoxy, carboxylate, 1,3-diketonate, 1,3-ketoesterate or 1,3-ketoamidate ligands, especially organotitanates, and also amines, amidines such as, in particular, 1,8-diazabicyclo [5.4.0]undec-7-ene (DBU), 1,5-diazabicyclo[4.3.0]non-5-ene (DBN), 6-dibutylamino-1,8-diazabicyclo[5.4.0]undec-7-ene, 6-dibutylamino-1,8-diazabicyclo[5.4.0]undec-7-ene, N,N'-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydropyrimidine, N-(3-trimethoxysilylpropyl)-4,5-dihydroimidazole, N-(3-triethoxysilylpropyl)-4,5-dihydroimidazole, 1-(3-dimethylaminopropyl)-2-methyl-1,4,5,6-tetrahydropyrimidine, 1-(3-aminopropyl)-2-methyl-1,4,5,6-tetrahydropyrimidine or reaction products thereof, or guanidines such as, in particular, 1-butylguanidine, 1,1-dimethylguanidine, 1,3-dimethylguanidine, 1,1,3,3-tetramethylguanidine (TMG), 2-(3-(trimethoxysilyl)propyl)-1,1,3, 3-tetramethylguanidine, 2-(3-(methyldimethoxysilyl) propyl)-1,1,3,3-tetramethylguanidine, 2-(3-(triethoxysilyl) propyl)-1,1,3,3-tetramethylguanidine, 1,5,7-triazabicyclo [4.4.0]dec-5-ene (TBD), 7-methyl-1,5,7-triazabicyclo [4.4.0]dec-5-ene, 7-cyclohexyl-1,5,7-triazabicyclo[4.4.0] dec-5-ene, 1-phenylguanidine, 1-(o-tolyl)guanidine (OTG), 1,3-diphenylguanidine, 1,3-di(o-tolyl)guanidine, 2-guanidinobenzimidazole or guanidines from the reaction of monoamines, polyamines or aminosilanes with carbodiimides, especially dicyclohexylcarbodiimide or diisopropylcarbodiimide, and biguanides or imidazoles.

Preference is given to organotitanates, especially bis (ethylacetoacetato)diisobutoxytitanium(IV) (commercially available, for example, as Tyzor® IBAY from Dorf Ketal), bis(ethylacetoacetato)diisopropoxytitanium(IV) (commercially available, for example, as Tyzor® DC from Dorf Ketal), bis(acetylacetonato)diisopropoxytitanium(IV), bis (acetylacetonato)diisobutoxytitanium(IV), tris(oxyethyl) amineisopropoxytitanium(IV), bis[tris(oxyethyl)amine]diisopropoxytitanium(IV), bis(2-ethylhexane-1,3-dioxy) titanium(IV), tris[24(2-aminoethyl)amino)ethoxy] ethoxytitanium(IV), bis(neopentyl(diallyl)oxy) diethoxytitanium(IV), tetra(isopropoxy)titanate, tetra(n-butoxy)titanate, tetra(2-ethylhexyloxy)titanate or polybutyl titanate, especially bis(ethylacetoacetato)diisobutoxytitanium(IV) or bis(ethylacetoacetato)diisopropoxytitanium(IV).

Preference is further given to amidines or guanidines, especially DBU, 1-(3-dimethylaminopropyl)-2-methyl-1,4, 5,6-tetrahydropyrimidine, 1-(3-aminopropyl)-2-methyl-1,4, 5,6-tetrahydropyrimidine or reaction products thereof, or guanidines from the reaction of monoamines, polyamines or aminosilanes with dicyclohexylcarbodiimide or diisopropylcarbodiimide.

Preference is further given to combinations of these catalysts, especially combinations of at least one organotitanate and at least one amidine or guanidine.

Suitable catalysts are also catalysts for the acceleration of the reaction of isocyanate groups, especially organotin(IV)

compounds, such as especially dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth(III) or zirconium(IV), especially with ligands selected from alkoxides, carboxylates, 1,3-diketonates, oxinate, 1,3-ketoesterates and 1,3-ketoamidates, or compounds containing tertiary amino groups, such as especially 2,2'-dimorpholinodiethyl ether (DMDEE).

Suitable catalysts are also catalysts for the hydrolysis of latent curing agents, especially carboxylic acids, such as 2-ethylhexanoic acid, lauric acid, stearic acid, neodecanoic acid, benzoic acid, salicylic acid or 2-nitrobenzoic acid, organic carboxylic anhydrides, silyl esters of carboxylic acids, organic sulfonic acids, sulfonic esters, other organic or inorganic acids, or mixtures of the abovementioned acids or esters. Preference is given to aromatic carboxylic acids such as benzoic acid, 2-nitrobenzoic acid or especially salicylic acid.

The curable composition may comprise further additions, especially those already mentioned, and also
- further catalysts which accelerate the reaction of the isocyanate groups and/or silane groups, especially salts, soaps or complexes of tin(II), iron, aluminum, molybdenum, dioxomolybdenum or potassium, especially aluminum lactate, aluminum oleate or potassium acetate; compounds containing tertiary amino groups, especially N-ethyldiisopropylamine, N,N,N',N'-tetramethylalkylenediamines, pentamethylalkylenetriamines and higher homologs thereof, bis(N,N-diethylaminoethyl) adipate, tris(3-dimethylaminopropyl)amine, 1,4-diazabicyclo[2.2.2]octane (DABCO), N-alkylmorpholines, N,N'-dimethylpiperazine; aromatic nitrogen compounds, such as 4-dimethylaminopyridine, N-methylimidazole, N-vinylimidazole or 1,2-dimethylimidazole; organic ammonium compounds, such as benzyltrimethylammonium hydroxide or alkoxylated tertiary amines; and what are called "delayed action" catalysts, which are modifications of known metal or amine catalysts;
- rheology modifiers, especially urea compounds, sheet silicates such as bentonites, derivatives of castor oil, hydrogenated castor oil, polyamides, polyurethanes, fumed silicas, cellulose ethers or hydrophobically modified polyoxyethylenes; or
- additives, especially wetting agents, leveling agents, defoamers, deaerators, stabilizers against oxidation, heat, light or UV radiation, or biocides; or further substances customarily used in curable compositions.

It may be advisable to chemically or physically dry certain substances before mixing them into the composition.

A preferred curable composition comprises
- 20% to 80% by weight of a polymer containing isocyanate and/or silane groups or—in the case of a two-component polyurethane composition—of the sum total of polyols, amines, latent curing agents, polyisocyanates and polymers containing isocyanate groups,
- 10% to 60% by weight of fillers, and
- 5% to 40% by weight of polyether having blocked hydroxyl groups.

The curable composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The curable composition may be formulated in such a way that it has a pasty consistency with a high yield point, especially for use as an adhesive or sealant. Such a composition can be applied by spatula or under pressure by means of a suitable device, for example by means of a cartridge gun or a drum pump or an application robot, wherein the composition is especially discharged in the form of a bead having an essentially round or triangular cross-sectional area.

The curable composition can also be formulated such that it is fluid and "self-leveling" or only slightly thixotropic, especially for use as sealing compound or coating. Such a composition can be applied by pouring it out or by spatula. In the form of a coating, it can then be distributed over an area to give the desired layer thickness, for example by means of a roll, doctor blade, notched trowel or rubber squeegee. In one operation, typically a layer thickness in the range from 0.5 to 5 mm, especially 1 to 3 mm, is applied.

The process of curing begins in the course of application of the curable composition, forming the elastomer composition described.

In the case of a one-component moisture-curing composition, it is applied as such and then begins to cure under the influence of moisture or water. For acceleration of the curing, an accelerator component which contains or releases water and/or a catalyst can be mixed into the composition on application, or the composition, after application thereof, can be contacted with such an accelerator component. In the case of a two-component composition, it is applied after the mixing of the two components and begins to cure by internal reaction, and the curing may be completed by the action of external moisture. The two components can be mixed continuously or batchwise with dynamic mixers or static mixers.

In the course of curing, isocyanate groups present react under the influence of moisture with one another and/or with any further reactive groups present in the composition, especially hydroxyl groups or amino groups. In addition, isocyanate groups present react with hydrolyzing reactive groups of any latent curing agents present. Silane groups present react with one another under the influence of moisture in the course of curing. They can be hydrolyzed on contact with moisture to give silanol groups (Si—OH groups). Silane groups present can condense with silanol groups present to give siloxane groups (Si—O—Si groups).

As a result of these reactions, the composition cures and develops adhesion to the thermoplastic substrate, giving the adhesive bond of the invention.

The moisture required for curing of a moisture-curing composition preferably gets into the composition through diffusion from the air (air humidity). In the process, a solid layer of cured composition (skin) is formed on the surfaces of the composition which come into contact with air. The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying.

The adhesive bond of the invention is preferably a bond or a seal or a coating. If the adhesive bond is a bond or seal, the elastomer composition is typically disposed between two or more substrates to which it adheres. At least one of the substrates here is the thermoplastic substrate. The further substrate present may be the same thermoplastic substrate, or a different thermoplastic substrate may be present, or the substrate may be any other substrate.

Suitable further substrates are

- glass, glass ceramic, concrete, mortar, fiber cement, especially fiber cement boards, brick, tile, gypsum, especially gypsum boards, or natural stone, such as granite or marble;
- repair or leveling compounds based on PCC (polymer-modified cement mortar) or ECC (epoxy resin-modified cement mortar);
- metals or alloys, such as aluminum, copper, iron, steel, nonferrous metals, including surface-finished metals or alloys, such as zinc-plated or chromium-plated metals; asphalt or bitumen;
- leather, textiles, paper, wood, wood materials bonded with resins, such as phenolic, melamine or epoxy resins, resin/textile composites or further materials called polymer composites;
- plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
- fiber-reinforced plastics, such as carbon fiber-reinforced plastics (CFP), glass fiber-reinforced plastics (GFP) and sheet molding compounds (SMC);
- insulation foams, especially made of EPS, XPS, PUR, PIR, rock wool, glass wool or foamed glass;
- coated or painted substrates, especially painted tiles, coated concrete, powder-coated metals or alloys or painted metal sheets;
- paints or varnishes.

If required, the substrates can be pretreated prior to application, especially by physical and/or chemical cleaning methods or the application of an activator or a primer.

The adhesive bond of the invention is especially part of an article bonded to or sealed to or coated with the elastomer composition. This article may be a built structure above or below ground or part thereof, or it may be an industrial good or a consumer good, especially a window, a pipe, a domestic appliance or a mode of transport, such as, in particular, an automobile, a bus, a truck, a rail vehicle, a ship, an aircraft or a helicopter, or an installable component thereof.

With the adhesive bond of the invention, it is possible even to bond plastics having a marked tendency to stress cracking, such as polycarbonate in particular, essentially without stress cracking and hence reliably and permanently to the elastomer composition. This is especially enabled by the presence of the polyether having blocked hydroxyl groups in the elastomer composition, which does not impair the storage stability of the uncured elastomer composition and dilutes it efficiently, such that it has good applicability, and shows high elastifying action in the elastomer composition and hence enables markedly elastic properties of the composition, as typically required in the bonding of thermoplastics.

The invention further provides for the use of a curable composition comprising at least one polymer containing isocyanate groups and/or silane groups and at least one polyether having blocked hydroxyl groups, as described above, for bonding, sealing or coating of at least one thermoplastic substrate, as described above.

EXAMPLES

Working examples are adduced hereinafter, which are intended to elucidate the invention described. The invention is of course not limited to these described working examples.

"Standard climatic conditions" ("SCC") refer to a temperature of 23±1° C. and a relative air humidity of 50±5%.

Unless otherwise stated, the chemicals used were from Sigma-Aldrich Chemie GmbH.

Preparation of Polyethers Having Blocked Hydroxyl Groups:

Viscosity was measured with a thermostated Rheotec RC30 cone-plate viscometer (cone diameter 25 mm, cone angle 1°, cone tip-plate distance 0.05 mm, shear rate 10 s$^{-1}$).

Infrared spectra (FT-IR) were measured as undiluted films on a Nicolet iS5 FT-IR instrument from Thermo Scientific equipped with a horizontal ATR measurement unit with a diamond crystal. The absorption bands are reported in wavenumbers (cm$^{-1}$).

$^1$H NMR spectra were measured on a spectrometer of the Bruker Ascend 400 type at 400.14 MHz; the chemical shifts δ are reported in ppm relative to tetramethylsilane (TMS). No distinction was made between true coupling and pseudo-coupling patterns.

Polyether-1: N-Butanol-Started Acetylated PPG Monool with Average Molecular Weight about 800 g/mol 120.00 g of n-butanol-started polyoxypropylene monool (Synalox® 100-20B, average molecular weight about 750 g/mol; from DowDuPont Inc.) and 18.74 g of acetic anhydride were initially charged in a round-bottom flask with distillation attachment under a nitrogen atmosphere. Then the reaction mixture was stirred under a gentle nitrogen stream at 130° C., with collection of acetic acid as distillate. Subsequently, the volatile constituents were removed from the reaction mixture at 80° C. and a reduced pressure of 10 mbar. A clear, colorless liquid having a viscosity of 75 mPa·s at 20° C. was obtained.

FT-IR: 2970, 2931, 2867, 1738, 1454, 1372, 1345, 1296, 1241, 1098, 1014, 959, 925, 866, 827.

$^1$H NMR (CDCl$_3$): 5.02 (hept., 1H, CH$_2$(CH$_3$)CH—OAc), 3.75-3.34 (2×m, ca. 39H, OCH$_2$CH(CH$_3$)O), 3.33-3.28 (m, 2H, CH$_3$CH$_2$CH$_2$CH$_2$O), 2.04 (s, 3H, O(CO)CH$_3$), 1.55 (quint., 2H, CH$_3$CH$_2$CH$_2$CH$_2$O), 1.36 (sext., 2H, CH$_3$CH$_2$CH$_2$CH$_2$O), 1.22 (d, 3H, CH$_2$(CH$_3$)CH—OAc), 1.17-1.10 (m, ca. 36H, OCH$_2$CH(CH$_3$)O), 0.91 (t, 3H, CH$_3$CH$_2$CH$_2$CH$_2$O).

Polyether-2: Diacetylated PPG Diol with Average Molecular Weight about 1,100 g/mol 80.00 g of polyoxypropylene diol (Voranol® P 1010, OH number 110 mg KOH/g; from DowDuPont Inc.) and 18.74 g of acetic anhydride were converted as described for Polyether-1. A clear, colorless liquid having a viscosity of 145 mPa·s at 20° C. was obtained.

Polyether-3: Diacetylated PPG Diol with Average Molecular Weight about 2,100 g/mol 160.00 g of polyoxypropylene diol (Voranol® 2000 L, OH number 56 mg KOH/g; from DowDuPont Inc.) and 18.74 g of acetic anhydride were converted as described for Polyether-1. A clear, colorless liquid having a viscosity of 400 mPa·s at 20° C. was obtained.

Polyether-4: Diacetylated PPG Diol with Average Molecular Weight about 4,100 g/mol 600.0 g of polyoxypropylene diol (Acclaim® 4200, OH number 28 mg KOH/g; from Covestro AG) and 33.7 g of acetic anhydride were converted as described for Polyether-1. A clear, colorless liquid having a viscosity of 1,150 mPa·s at 20° C. was obtained.

Polyether-5: Diacetylated PPG Diol with Average Molecular Weight about 8,100 g/mol 600.0 g of polyoxypropylene diol (Acclaim® 8200, OH number 14 mg KOH/g; from Covestro AG) and 16.8 g of acetic anhydride were converted as described for Polyether-1. A clear, colorless liquid having a viscosity of 3,800 mPa·s at 20° C. was obtained.

Polyether-6: PPG Diol Having Two p-Toluenesulfonylurethane End Groups and Average Molecular Weight about 12,400 g/mol 600.0 g of polyoxypropylene diol (Acclaim® 12200, from Covestro AG; average molecular weight about 12,000 g/mol) and 13.5 g of p-toluenesulfonyl isocyanate were initially charged in a round-bottom flask with distillation attachment under a nitrogen atmosphere. Then the reaction mixture was stirred at 130° C. under a gentle nitrogen stream for 3 hours. Subsequently, the volatile constituents were removed from the reaction mixture at 80° C. and a reduced pressure of 10 mbar. A clear, colorless liquid having a viscosity of 12,700 mPa·s at 20° C. was obtained.

Commercial Substances Used:

DINP: diisononyl phthalate (Palatinol® N, from BASF SE)
DIDP: diisodecyl phthalate (Palatinol® 10-P, from BASF SE)
DINCH: diisononyl cyclohexane-1,2-dicarboxylate (Hexamoll® DINCH, from BASF SE)
DOA: di(2-ethylhexyl) adipate (Adimoll® DO, from Lanxess AG)
ATBC: acetyl tributyl citrate
FAE: aliphatic fatty acid ester (Sovermol® 1058, from BASF SE)
Chalk: Omyacarb® 5-GU (from Omya AG)
Carbon Monarch® 570 (from Cabot Corp.) black:
Fumed silica: Aerosil® R 972 (from Evonik Industries AG)
DMDEE 2,2'-dimorpholinodiethyl ether
pTSI p-toluenesulfonyl isocyanate Preparation of Polymers Containing Isocyanate Groups:

Polymer P1:

727.0 g of polyoxypropylene diol (Acclaim® 4200, from Covestro AG; OH number 28.5 mg KOH/g) and 273.0 g of diphenylmethane 4,4'-diisocyanate (Desmodur® 44 MC L, from Covestro AG) were converted by a known method at 80° C. to a polymer having an isocyanate group content of 7.6% by weight, a viscosity of 5.2 Pas at 20° C. and a monomeric diphenylmethane 4,4'-diisocyanate content of about 18% by weight. Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polymer thus obtained had an isocyanate group content of 1.8% by weight, a viscosity of 15.2 Pas at 20° C. and a monomeric diphenylmethane 4,4'-diisocyanate content of 0.08% by weight.

Polymer P2:

725.0 g of ethylene oxide-terminated polyoxypropylene triol (Desmophen® 5031 BT, from Covestro AG; OH number 28 mg KOH/g) and 275 g of diphenylmethane 4,4'-diisocyanate (Desmodur® 44 MC L, from Covestro AG) were converted by a known method at 80° C. to a polymer having an isocyanate group content of 7.6% by weight, a viscosity of 6.5 Pas at 20° C. and a monomeric diphenylmethane 4,4'-diisocyanate content of about 20% by weight. Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polymer thus obtained had an isocyanate group content of 1.7% by weight, a viscosity of 19 Pas at 20° C. and a monomeric diphenylmethane 4,4'-diisocyanate content of 0.04% by weight.

Polymer P3:

724.0 g of polyoxypropylene triol (Acclaim® 6300, from Covestro AG; OH number 28 mg KOH/g) and 276.0 g of diphenylmethane 4,4'-diisocyanate (Desmodur® 44 MC L, from Covestro AG) were converted by a known method at 80° C. to a polymer having an isocyanate group content of 7.5% by weight, a viscosity of 9.9 Pas at 20° C. and a monomeric diphenylmethane 4,4'-diisocyanate content of about 20% by weight. Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polymer thus obtained had an isocyanate group content of 1.7% by weight, a viscosity of 34.7 Pas at 20° C. and a monomeric diphenylmethane 4,4'-diisocyanate content of 0.06% by weight.

Production of Curable Compositions and Adhesive Bonds to Polycarbonate:

Compositions Z1 to Z12 (Two-Component)

For each example, the first component ("component 1") used was the commercial A component specified in tables 1 and 2 (SikaForce®-7777 L05, structural two-component PU adhesive with A component based on polyol, filled, gray; or SikaForce®-7584, flexible two-component PU adhesive with A component based on polyol, filled, black, both from Sika Schweiz AG). The second component ("component 2") used was mixtures of 80 parts by weight of Adiprene® LFM E730 (MDI-terminated, difunctional, polyether-based polyurethane polymer with NCO content 7.35% by weight and a low content of monomeric MDI, from Lanxess AG) and 20 parts by weight of the respective plasticizer specified in tables 1 and 2; the mixtures were produced by means of a centrifugal mixer (SpeedMixer™ DAC 150, FlackTek Inc.) with exclusion of moisture and stored.

The two components were processed with exclusion of moisture in the mixing ratio specified in tables 1 and 2 by means of the centrifugal mixer to give a homogeneous paste, and this was immediately used or tested as follows: Each composition was used to produce multiple adhesive bonds to polycarbonate. For this purpose, the paste was applied in each case to an isopropanol-degreased plaque of polycarbonate PC1 (=Makrolon® GP Clear 099, from Covestro AG) of size 150×30×2 mm in the middle over an area of 30×30 mm in a layer thickness of 2 mm, and stored/cured under standard climatic conditions for 7 days. Several adhesive bonds of this kind were then clamped across a round piece of timber having a diameter of 35 mm that had been mounted on a board and secured at the ends such that each adhesive bond was fixed in a curved position. This arrangement was stored in an air circulation oven at 80° C. for 24 h or 7 days and then, after conditioning under standard climatic conditions for 24 h, assessed visually as to the extent to which the plaque persisted in the curved state and whether stress cracks were visible in the polycarbonate. The results are reported in tables 1 and 2 as "Bending of PC1" and "Crazing of PC1".

For the crazing, the numbers mean:
0: no cracks
1: few short superficial cracks at the edges of the composition
2: some short superficial cracks at the edges of the composition
3: some deeper cracks over the entire width of the plaque
4: many deeper cracks over the entire width of the plaque
5: very many deeper cracks over the entire width of the plaque Compositions labeled "(Ref.)" are comparative examples.

TABLE 1

Composition (in parts by weight) of Z1 to Z6 and properties of the adhesive bonds therewith.

| Composition | Z1 | Z2 (Ref.) | Z3 (Ref.) | Z4 (Ref.) | Z5 (Ref.) | Z6 (Ref.) |
|---|---|---|---|---|---|---|
| Component 1: SikaForce ®-7584, A component | 100.0 | 100.0 | 100.0 | 100.0 | 100.0 | 100.0 |
| Component 2: Adiprene ® LFM E730 | 80.0 | 80.0 | 80.0 | 80.0 | 80.0 | 80.0 |
| Plasticizer | Polyether-1 20.0 | DINP 20.0 | DINCH 20.0 | DOA 20.0 | ATBC 20.0 | FAE 20.0 |
| Mixing ratio[1] | 100/126 | 100/126 | 100/126 | 100/126 | 100/126 | 100/126 |
| Bending 1 d 80° C. | slight | moderate | moderate | severe | moderate | severe |
| of PC1  7 d 80° C. | slight | moderate | moderate | v. severe | moderate | v. severe |
| Crazing 1 d 80° C. | 1 | 4 | 4 | 4 | 4 | 4 |
| of PC1  7 d 80° C. | 1 | 4 | 5 | 5 | 4 | 5 |

"v. severe" stands for "very severe"
[1] in parts by weight of component 1/component 2

TABLE 2

Composition (in parts by weight) of Z7 to Z12 and properties of the adhesive bonds therewith.

| Composition | Z7 | Z8 (Ref.) | Z9 (Ref.) | Z10 (Ref.) | Z11 (Ref.) | Z12 (Ref.) |
|---|---|---|---|---|---|---|
| Component 1: SikaForce ®-7777 L05, A comp. | 100.0 | 100.0 | 100.0 | 100.0 | 100.0 | 100.0 |
| Component 2: Adiprene ® LFM E730 | 80.0 | 80.0 | 80.0 | 80.0 | 80.0 | 80.0 |
| Plasticizer | Polyether-1 20.0 | DINP 20.0 | DINCH 20.0 | DOA 20.0 | ATBC 20.0 | FAE 20.0 |
| Mixing ratio[1] | 100/72 | 100/72 | 100/72 | 100/72 | 100/72 | 100/72 |
| Bending 1 d 80° C. | slight | moderate | moderate | moderate | moderate | moderate |
| of PC1  7 d 80° C. | slight | severe | severe | severe | severe | severe |
| Crazing 1 d 80° C. | 1 | 4 | 4 | 4 | 4 | 4 |
| of PC1  7 d 80° C. | 3 | 5 | 5 | 5 | 5 | 5 |

[1] in parts by weight of component 1/component 2

Compositions Z13 to Z16 (One-Component)

For each composition, the ingredients specified in table 3 were mixed in the amounts specified (in parts by weight) by means of a centrifugal mixer (SpeedMixer™ DAC 150, FlackTek Inc.) with exclusion of moisture at 3000 rpm for one minute.

An adhesive bond of each composition to polycarbonate was produced. For this purpose, the composition was applied to a plaque of polycarbonate PC1 (=Makrolon® GP Clear 099, from Covestro AG) of size 150×30×2 mm in the middle in the form of a bead over an area of 10×30 mm in a layer thickness of about 2 mm, and stored/cured under standard climatic conditions for 7 days. The adhesive bond was then clamped across a round piece of timber having a diameter of 35 mm that had been mounted on a board and secured at the ends such that the adhesive bond was fixed in a curved position. This arrangement was stored in an air circulation oven at 80° C. for 24 h and then, after conditioning under standard climatic conditions for 24 h, assessed visually on the scale specified for composition Z1 as to whether stress cracks were visible in the polycarbonate. The result is reported as "Crazing of PC1".

To determine the mechanical properties, each composition was applied to a PTFE-coated film to give a film of thickness 2 mm, the film was stored under standard climatic conditions for 14 days, and a few dumbbells having a length of 75 mm with a bar length of 30 mm and a bar width of 4 mm were punched out of the film and these were tested in accordance with DIN EN 53504 at a strain rate of 200 mm/min for Tensile strength (breaking force), Elongation at break, Modulus of elasticity 5% (at 0.5%-5% elongation) and Modulus of elasticity 50% (at 0.5%-50% elongation).

To determine the strength of a bond, lap shear strength (LSS) was determined on glass. For this purpose, composite specimens were produced by bonding two glass plates that had been degreased with isopropanol and pretreated with Sika® Primer 207 (from Sika Schweiz AG) in such a way that the overlapping adhesive bond had dimensions of 12×25 mm and a thickness of 4 mm and the glass plates protruded at the top ends. After the composite specimens had been stored under standard climatic conditions for 7 d, lap shear strength was tested to DIN EN 1465 at a strain rate of 20 mm/min.

Shore A hardness was determined according to DIN 53505 on test specimens cured under standard climatic conditions for 7 d.

The results are reported in table 3.

Compositions labeled "(Ref.)" are comparative examples.

TABLE 3

Composition (in parts by weight) and properties of Z13 to Z16.

| Composition | Z13 (Ref.) | Z14 | Z15 | Z16 |
|---|---|---|---|---|
| Polymer P1 | 17.5 | 17.5 | 17.5 | 17.5 |
| Polymer P2 | 17.5 | 17.5 | 17.5 | 17.5 |
| Plasticizer | DINP | Polyether-1 | Polyether-2 | Polyether-4 |
|  | 20.4 | 20.4 | 20.4 | 20.4 |
| Carbon black | 10.0 | 10.0 | 10.0 | 10.0 |
| Chalk | 32.0 | 32.0 | 32.0 | 32.0 |
| Fumed silica | 2.0 | 2.0 | 2.0 | 2.0 |
| DMDEE | 0.2 | 0.2 | 0.2 | 0.2 |
| pTSI | 0.4 | 0.4 | 0.4 | 0.4 |
| Crazing of PC1 | 4 | 1 | 1 | 0 |
| Tensile strength [MPa] | 3.8 | 5.2 | 5.5 | 5.8 |
| Elongation at break [%] | 772 | 831 | 856 | 816 |
| Modulus of elasticity 5% [MPa] | 1.57 | 1.59 | 1.56 | 1.74 |
| Modulus of elasticity 50% [MPa] | 0.83 | 0.90 | 0.86 | 1.01 |
| LSS (glass) [MPa] | 2.41 | 2.71 | 2.13 | 2.74 |
| Shore A | 38 | 39 | 38 | 39 |

Compositions Z17 to Z20 (One-Component)

For each composition, the ingredients specified in table 4 were mixed in the amounts specified (in parts by weight) by means of a centrifugal mixer (SpeedMixer™ DAC 150, FlackTek Inc.) with exclusion of moisture at 3000 rpm for one minute.

An adhesive bond of each composition to polycarbonate was produced. For this purpose, the composition was applied to a plaque of polycarbonate PC2 (=Makrolon® AL2447, from Covestro AG) of size 150×70×5 mm in the middle in the form of a bead over an area of 10×100 mm in a layer thickness of about 2 mm, and stored/cured under standard climatic conditions for 7 days. The adhesive bond was then clamped across a round piece of timber having a diameter of 35 mm that had been mounted on a board and secured at the ends such that the adhesive bond was fixed in a curved position. This arrangement was stored in an air circulation oven at 80° C. for 24 h and then, after conditioning under standard climatic conditions for 24 h, assessed visually as to the extent to which the plaque persisted in the curved state and whether stress cracks were visible in the polycarbonate. The results are reported as "Bending of PC2" and "Crazing of PC2". For the crazing, the scale specified for composition Z1 was used.

The mechanical properties of tensile strength, elongation at break, modulus of elasticity 5% and modulus of elasticity 50% were tested as described for composition Z13.

The results are reported in table 4.

TABLE 4

Composition (in parts by weight) and properties of Z17 to Z20.

| Composition | Z17 | Z18 | Z19 | Z20 |
|---|---|---|---|---|
| Polymer P1 | 30.0 | 30.0 | 30.0 | 30.0 |
| Polymer P3 | 5.0 | 5.0 | 5.0 | 5.0 |
| Plasticizer | Polyether-3 | Polyether-4 | Polyether-5 | Polyether-6 |
|  | 20.4 | 20.4 | 20.4 | 20.4 |
| Carbon black | 10.0 | 10.0 | 10.0 | 10.0 |
| Chalk | 32.0 | 32.0 | 32.0 | 32.0 |
| Fumed silica | 2.0 | 2.0 | 2.0 | 2.0 |
| DMDEE | 0.2 | 0.2 | 0.2 | 0.2 |
| pTSI | 0.4 | 0.4 | 0.4 | 0.4 |
| Bending of PC2 | slight | slight | slight | slight |
| Crazing of PC2 | 2 | 1 | 0 | 0 |
| Tensile strength [MPa] | 6.4 | 6.7 | n.d. | 6.9 |
| Elongation at break [%] | 960 | 970 | n.d. | 950 |
| Modulus of elasticity 5% [MPa] | 1.76 | 1.76 | n.d. | 1.76 |
| Modulus of elasticity 50% [MPa] | 0.89 | 0.91 | n.d. | 0.84 |

"n.d." stands for "not determined"

The invention claimed is:

1. An article comprising
   (i) at least one thermoplastic substrate and
   (ii) a layer of an elastomer composition containing at least one plasticizer,
   wherein the layer of the elastomer composition is an adhesive directly adhered to the thermoplastic substrate, wherein the at least one plasticizer includes a polyether having blocked hydroxyl groups, wherein the polyether having blocked hydroxyl groups has an average molecular weight $M_n$ in a range from 4,000 to 8,500 g/mol, and wherein the thermoplastic substrate is a polycarbonate or polystyrene.

2. The article as claimed in claim 1, wherein the blocked hydroxyl groups are selected from the group consisting of ester, aceto ester, carbonate and urethane groups.

3. The article as claimed in claim 1, wherein 70% to 100% by weight of repeat units in the polyether consist of 1,2-propyleneoxy groups, and 0% to 30% by weight of the repeat units consist of 1,2-ethyleneoxy groups.

4. The article as claimed in claim 1, wherein the polyether having blocked hydroxyl groups is derived from at least one hydroxy-functional polyether selected from the group consisting of
   a polyoxypropylene monool formed from an alcohol monool, wherein the polyoxypropylene monool has an OH number in the range from 25 to 90 mg KOH/g,
   a polyoxypropylene diol having an OH number in the range from 9 to 155 mg KOH/g,
   an optionally ethylene oxide-terminated polyoxypropylene triol formed from trimethylolpropane or glycerol, wherein the optionally ethylene oxide-terminated polyoxypropylene triol has an average OH functionality in the range from 2.2 to 3 and an OH number in the range from 20 to 230 mg KOH/g, and
   a polyoxypropylene polyol formed from a sugar alcohol polyol, wherein the polyoxypropylene polyol has an average OH functionality in the range from 3 to 6.

5. The article as claimed in claim 4, wherein the polyether having blocked hydroxyl groups is derived from the polyoxypropylene monool formed from an alcohol monool, wherein the polyoxypropylene monool has an OH number in the range from 25 to 90 mg KOH/g or is derived from the polyoxypropylene diol having an OH number in the range from 45 to 125 mg KOH/g.

6. The article as claimed in claim 4, wherein the polyether having blocked hydroxyl groups is derived from the polyoxypropylene diol having an OH number in the range from 14 to 45 mg KOH/g or is derived from the optionally ethylene oxide-terminated polyoxypropylene triol formed from trimethylolpropane or glycerol, wherein the optionally ethylene oxide-terminated polyoxypropylene triol has an OH number in the range from 20 to 56 mg KOH/g.

7. The article as claimed in claim 1, wherein the elastomer composition further comprises at least one cured polyurethane polymer or cured silane-modified polymer.

8. The article as claimed in claim 1, wherein the elastomer composition contains 5% to 40% by weight of polyethers having blocked hydroxyl groups.

9. The article as claimed in claim 1, wherein the elastomer composition has a tensile strength of at least 1 MPa and an elongation at break of at least 50%, determined according to standard DIN EN 53504 at 23° C. on dumbbell-shaped test specimens having a thickness of 2 mm, a length of 75 mm, a bar length of 30 mm and a bar width of 4 mm.

10. A process for producing the article as claimed in claim 1, comprising the steps of
 (a) providing the at least one thermoplastic substrate,
 (b) providing a curable composition comprising the at least one polyether having blocked hydroxyl groups as plasticizer,
 (c) applying the curable composition to the thermoplastic substrate, and
 (d) curing the curable composition to form the elastomer composition that is the adhesive and is directly adhered to the thermoplastic substrate.

11. The process as claimed in claim 10, wherein the curable composition comprises at least one polymer containing isocyanate and/or silane groups.

* * * * *